United States Patent
Kwon et al.

(10) Patent No.: US 8,620,376 B2
(45) Date of Patent: Dec. 31, 2013

(54) METHOD AND APPARATUS FOR ADAPTIVE PEER TO PEER COMMUNICATION SELECTION IN WIRELESS COMMUNICATION SYSTEM

(75) Inventors: Il-Won Kwon, Ansan-si (KR); Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1135 days.

(21) Appl. No.: 12/169,404

(22) Filed: Jul. 8, 2008

(65) Prior Publication Data

US 2009/0017807 A1  Jan. 15, 2009

(30) Foreign Application Priority Data

Jul. 9, 2007  (KR) .................. 10-2007-0068843

(51) Int. Cl.
*H04M 1/00*  (2006.01)
(52) U.S. Cl.
USPC ............. 455/552.1; 455/436; 455/456.2; 455/517; 455/519; 455/41.2; 370/343; 370/324; 370/338; 370/293; 709/204
(58) Field of Classification Search
USPC .............. 455/425, 436, 456.2, 517, 519, 416, 455/41.2; 370/343, 324, 338, 293; 709/204
See application file for complete search history.

(56) References Cited

U.S. PATENT DOCUMENTS

| | | | |
|---|---|---|---|
| 5,903,618 A * | 5/1999 | Miyake et al. | 375/356 |
| 6,678,341 B1 * | 1/2004 | Miyake et al. | 375/356 |
| 7,548,758 B2 * | 6/2009 | Periyalwar et al. | 455/517 |
| 2005/0239451 A1 * | 10/2005 | Periyalwar et al. | 455/425 |
| 2007/0129076 A1 * | 6/2007 | Cho et al. | 455/436 |
| 2008/0002658 A1 * | 1/2008 | Soliman | 370/343 |
| 2009/0023460 A1 * | 1/2009 | Cho et al. | 455/456.2 |

FOREIGN PATENT DOCUMENTS

KR  10-2005-0101491 A  10/2005

OTHER PUBLICATIONS

H.-Y. Hsieh and R. Sivakumar, On Using Peer-to-Peer Communication in Cellular Wireless Data Networks, IEEE Trans. Mobile Comput., vol. 3, No. 1, pp. 57-72, Jan. 2004.

* cited by examiner

*Primary Examiner* — April G Gonzales
(74) *Attorney, Agent, or Firm* — Jefferson IP Law, LLP

(57) ABSTRACT

A method and apparatus for adaptively selecting a Peer-to-Peer (P2P) communication mode in a wireless communication system are provided. In a method of operating a Base Station (BS) for establishing a P2P connection between Mobile Stations (MSs) in the wireless communication system, the method includes, upon receiving a connection request message from a transmitting MS, broadcasting an instruction message to one or more neighbor MSs, receiving P2P-related information from a receiving MS among the neighbor MSs, selecting a communication mode by determining whether P2P communication is possible between MSs according to the P2P-related information and, if P2P communication is possible between the MSs, transmitting a connection response message to the transmitting MS and the receiving MS.

23 Claims, 6 Drawing Sheets

METHOD AND APPARATUS FOR ADAPTIVE PEER TO PEER COMMUNICATION SELECTION IN WIRELESS COMMUNICATION SYSTEM

PRIORITY

This application claims the benefit under 35 U.S.C. §119 (a) of a Korean patent application filed in the Korean Intellectual Property Office on Jul. 9, 2007 and assigned Serial No. 2007-68843, the entire disclosure of which is hereby incorporated by reference.

BACKGROUND OF THE INVENTION

1. Field of the Invention

The present invention relates to a method and apparatus for establishing a Peer-to-Peer (P2P) connection in a wireless communication system. More particularly, the present invention relates to a method and apparatus for adaptive P2P communication selection in consideration of a wireless environment between Mobile Stations (MSs).

2. Description of the Related Art

In a wireless communication system, whenever first and second Mobile Stations (MSs) desire to communicate with each other, the first or transmitting MS must make a call to the second or receiving MS through a wireless communication network regardless of the distance between the transmitting and receiving MSs. That is, a connection with the receiving MS is established via a Base Station (BS), a mobile switching center, or the like, constituting the wireless communication system, regardless of the distance between the transmitting MS and the receiving MS. However, if the distance between the transmitting MS and the receiving MS is very close, direct communication can be more reasonable. Direct communication, that is, communication that is not established via the BS, is referred to as Peer-to-Peer (P2P) communication. Various services can be provided through the P2P communication, such as, transmission of a massive file, Voice over Internet Protocol (VoIP), video conference, etc. Also, the P2P communication can provide the same service quality as that conventionally provided via the BS.

The MSs conventionally use a different frequency band for general P2P communication than a frequency band allocated to the wireless communication system. To process the additional frequency band, a separate Radio Frequency (RF) transmitting/receiving apparatus is used. For example, Infrared Data Association (IrDA) communication, Bluetooth communication, etc., are used in the P2P communication. Alternatively, when the P2P communication and the wireless communication use the same frequency band, bandwidth efficiency can be improved by flexibly adjusting each transmission band through effective resource management so long as interference is prevented. One project that is researching such P2P communication is the Wireless world Initiative NEw Radio (WINNER) system in Europe.

FIG. 1 illustrates an example of a P2P communication environment in a wireless communication system.

Referring to FIG. 1, a plurality of MSs 102, 104 and 106 are located in a service coverage area of a BS 100, and the MS_y 108 is located in a service coverage area of another BS 110. The MSs 102 to 108 can communicate with receiving MSs via the corresponding BSs 100 and 110. Although an additional P2P communication module is not included, wireless resources of the mobile communication system can be reused to perform P2P communication between the MSs.

In the wireless communication system of FIG. 1, when the MS_1 102 desires to communicate with the MS_2 104, the MS_1 102 determines whether the connection will be established in a P2P communication mode or a wireless communication mode. For example, when the MS_1 102 detects that the receiving MS (i.e., the MS_2 104) is located close to the MS_1 102, the MS_1 102 can request the BS 100 to establish a P2P connection with the MS_2 104. Alternatively, the MS_1 102 may attempt direct P2P communication with the MS_2 104 not via the BS 100. In addition, although the MS_1 102 does not detect the location of the receiving MS (i.e., the MS_2 104), the MS_1 102 can perform P2P communication by gathering information of the MS_2 104. However, if the MS_1 102 is located in the service coverage area of the BS 100 and desires P2P communication with the MS_y 108 whose location is not detected, the MS_1 102 cannot perform P2P communication with the MS_y 108 because the MS_1 102 cannot gather information of the MS_y 108 due to a distance between the MS_1 102 and the MS_y 108. In such a case, in order to communicate with the MS_y 108 (or the MS_x 106), it is preferable that the MS_1 102 establishes a BS-assisted connection instead of establishing the P2P connection.

To perform communication, the MS_1 102 must select either the P2P communication mode or the wireless communication mode by considering a wireless environment and a distance from the receiving MS, which is difficult in practice. Even if the selection of a communication mode is achieved by the MS_1 102 in consideration of the wireless environment and the distance from the receiving MS, there is no guarantee that the selected communication mode is effective in terms of resource utilization.

As described above, when an MS attempts a call connection with another MS in a wireless communication system, there is no method of adaptively selecting a communication mode between BS-assisted communication (i.e., wireless communication) and P2P communication among MSs by considering effective utilization of overall resources from the viewpoint of a BS.

SUMMARY OF THE INVENTION

An aspect of the present invention is to address at least the above-mentioned problems and/or disadvantages and to provide at least the advantages described below. Accordingly, an aspect of the present invention is to provide a method and apparatus for establishing a Peer-to-Peer (P2P) connection in a wireless communication system.

In accordance with an aspect of the present invention, a method of operating a Base Station (BS) for establishing a communication mode between Mobile Stations (MSs) in a wireless communication system is provided. The method includes, upon receiving a connection request message from a transmitting MS, broadcasting an instruction message to one or more neighbor MSs, receiving P2P-related information from a receiving MS among the neighbor MSs, selecting a communication mode by determining whether P2P communication is possible between MSs according to the P2P-related information and, if P2P communication is possible between the MSs, transmitting a connection response message to the transmitting MS and the receiving MS.

In accordance with another aspect of the present invention, a method of operating a transmitting MS for establishing a communication mode between MSs in a wireless communication system is provided. The method includes, after requesting a connection to a BS, broadcasting a P2P report request message for checking possibility of P2P communication with a receiving MS, after broadcasting the P2P report request message, receiving a connection response message that informs the possibility of P2P communication with the receiving MS and establishing a connection with the receiving MS in a desired communication mode according to the connection response message.

In accordance with another aspect of the present invention, a method of operating a receiving MS for establishing a communication mode between MSs in a wireless communication system is provided. The method includes, after receiving a P2P setup ready message for instructing preparation of P2P setup from a BS, preparing P2P setup, after preparing the P2P setup, receiving a P2P report request message for checking possibility of P2P communication from a transmitting MS and reporting P2P-related information to the BS.

In accordance with another aspect of the present invention, a BS apparatus for establishing a communication mode between MSs in a wireless communication system is provided. The apparatus includes a controller for broadcasting an instruction message to one or more neighbor MSs upon receiving a connection request message from a transmitting MS, for receiving P2P-related information from a receiving MS among the neighbor MSs, and, if P2P communication is possible between the MSs, for transmitting a connection response message to the transmitting MS and the receiving MS and a mode selector for selecting a communication mode by determining whether P2P communication is possible between MSs according to the P2P-related information.

In accordance with another aspect of the present invention, a transmitting MS apparatus for establishing a communication mode between MSs in a wireless communication system is provided. The apparatus includes a controller for broadcasting a P2P report request message for checking possibility of P2P communication with a receiving MS after requesting a connection to a BS, for receiving a connection response message that informs the possibility of P2P communication with the receiving MS after broadcasting the P2P report request message, and for establishing a connection with the receiving MS in a desired communication mode according to the connection response message.

In accordance with another aspect of the present invention, a receiving MS apparatus for establishing a communication mode between MSs in a wireless communication system is provided. The apparatus includes a controller for preparing P2P setup after receiving a P2P setup ready message for instructing preparation of P2P setup from a BS, for receiving a P2P report request message for checking possibility of P2P communication from a transmitting MS after preparing the P2P setup, and for reporting P2P-related information to the BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions will be omitted for clarity and conciseness.

Hereinafter, an exemplary method and apparatus for adaptively selecting a communication mode by a Base Station (BS) in consideration of a wireless environment between Mobile Stations (MSs) in a wireless communication system will be described. The communication mode includes a Peer-to-Peer (P2P) communication mode and a wireless communication mode. The P2P communication mode is defined as a mode in which two MSs communicate with each other not via the BS. The wireless communication mode is defined as a mode in which communication is achieved via the BS.

Figure 1:
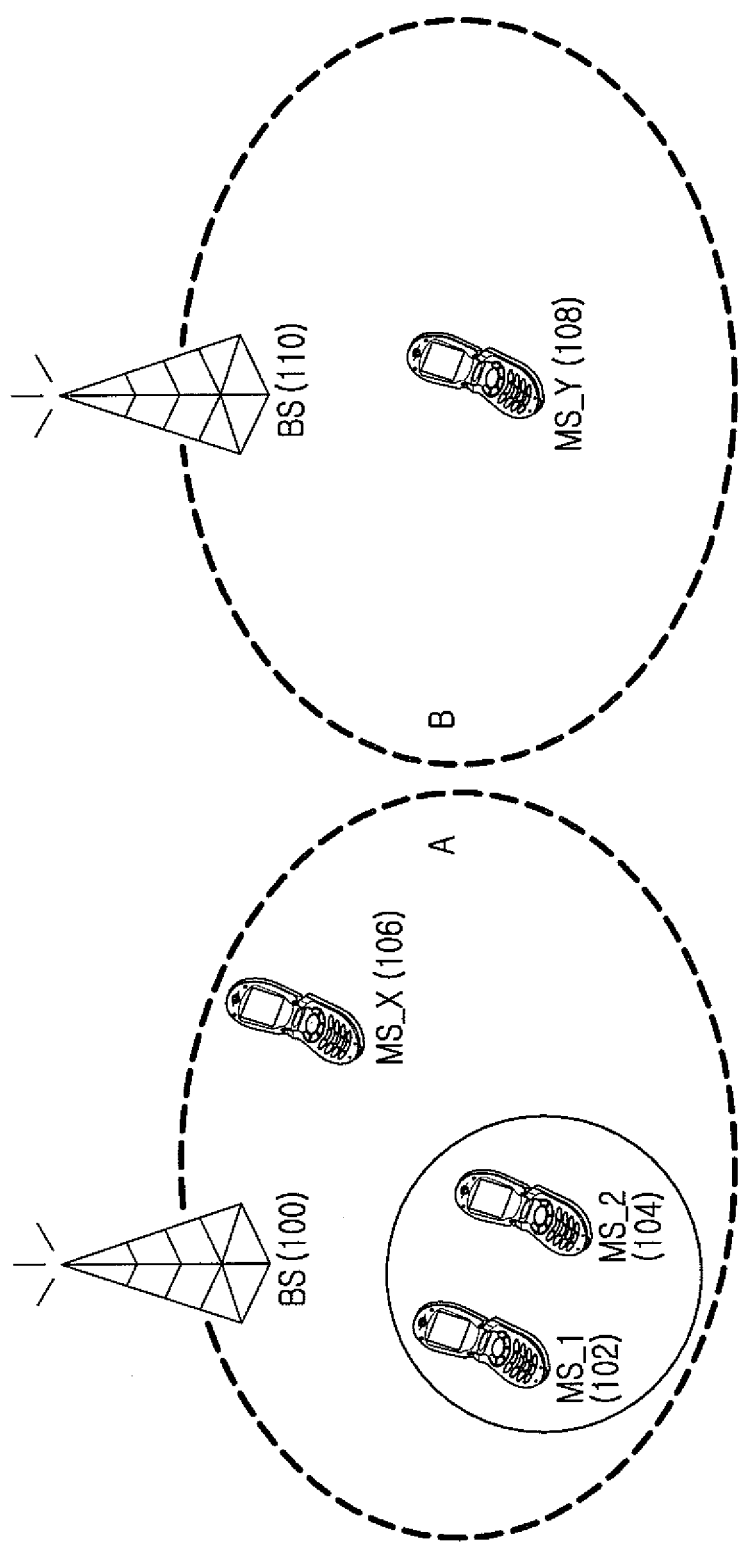
FIG. 1 illustrates an example of a Peer-to-Peer (P2P) communication environment in a wireless communication system.

In a P2P communication environment shown in FIG. 1, an MS_1 102 desires communication with a receiving MS which may be located within a service coverage area A of a BS 100 or may be located within a cell or service coverage area B of BS 110. In such a situation, if the MS_1 102 desires communication with an MS_2 104, direct communication between the MSs (i.e., P2P communication) is advantageous over wireless communication via the BS in terms of channel conditions and resource utilization. Some MSs (e.g., an MS_x 106 and an MS_y 108) are located in a region where a signal transmitted from the MS_1 102 cannot be delivered. In this case, since P2P communication cannot be achieved, communication using the BS is more effective. An exemplary process of adaptively establishing a P2P connection will be described below with reference to FIG. 2.

Figure 2:
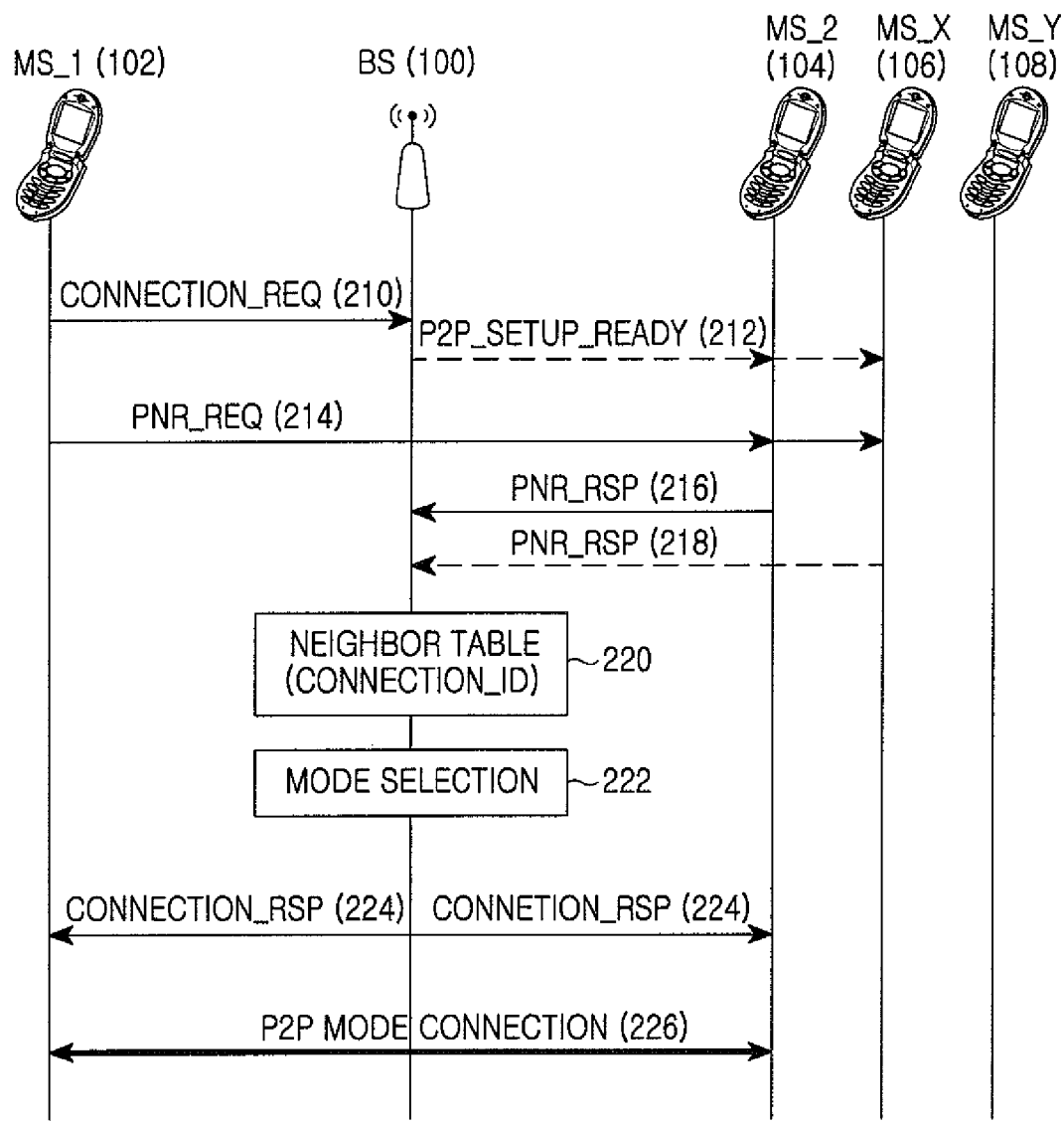
FIG. 2 is a flow diagram illustrating signal flows when a Base Station (BS) selects a communication mode by considering a wireless environment between MSs in a wireless communication system according to an exemplary embodiment of the present invention.

FIG. 2 is a flow diagram illustrating signal flows when a BS selects a communication mode by considering a wireless environment between MSs in a wireless communication system according to an exemplary embodiment of the present invention.

Referring to FIG. 2, an MS 102 transmits a connection request (hereinafter, connection_req) message to a BS 100 in step 210. The connection_req message transmitted by MS 102 indicates a desire by the MS 102 to communicate with an MS 104. That is, in the illustrated example of FIG. 2, the MS 102 is a transmitting MS which desires general communication. Since the MS 102 does not know a location of the receiving MS 104 or a current wireless channel condition, the MS 102 requests the BS 100 to establish a general call connection according to a preset communication link.

In step 212, in order to determine the possibility of P2P communication before establishing a connection in the wireless communication mode, the BS 100 broadcasts a P2P setup preparation (hereinafter, P2P_setup_ready) message to MSs 104, 106, and 108. In this case, the MSs 104 and 106, located in a service coverage area of the BS 100, receive the P2P_setup_ready message, and prepare to receive a P2P Neighbor Report request (hereinafter, PNR_req) message from their neighbor MSs. However, the MS 108 is located too far from the BS 100 and thus cannot receive the P2P_setup_ready message.

The MSs 104 and 106, which have received the P2P_setup_ready message and are located within the service coverage area of the BS 100, may be in a state of a sleep mode in which no communication is currently made with the BS 100 or in a state in which the MS is currently communicating with another MS. In the former case, the sleep mode is shifted to a P2P active mode, and power consumed in the MSs can be effectively reduced. In the latter case, by receiving the P2P_setup_ready message, wireless communication and P2P communication can be simultaneously performed.

After a time period has elapsed, the MS 102 broadcasts the PNR_req message in step 214 so that the MS 104 will transmit P2P-related information to the BS 100. The time period is begun in step 210 when the MS 102 transmits the connection_req message and has a duration sufficient to allow the receiving MSs to receive the P2P_setup_ready message and prepare for receipt of the PNR_req message.

In step 216, the BS 100 receives a message in response to the PNR_req message (hereinafter, the response message will be referred to as a PNR_rsp message) from the MS 104 among the MSs 104 and 106 which have received the PNR_req message. The PNR_rsp message includes a variety of information such as a P2P group IDentifier (ID) (hereinafter, P2P_GroupID), a transmitting MS ID (hereinafter, Sender_ID), channel power information (hereinafter, Channel_Power_info), a call status (hereinafter, Call_status), etc. According to an exemplary embodiment, as shown in step 218, the BS 100 may receive the PNR_rsp message not only from the corresponding MSs but also from all or some of MSs which have received the PNR_req message.

In step 220, the BS 100 determines whether P2P communication will be used between the MS 102 and the MS 104 according to information included in the PNR_rsp message received from MS 104. In other words, the BS 100 determines whether the MS 102 and the MS 104 are in an environment where P2P communication can be achieved and is favorable. In an exemplary implementation, the BS 100 creates a list or table of neighbor MSs that have responded to the PNR_req message, listing the MSs by connection ID, including their associated P2P information obtained in the PNR_rsp messages. The table may include results regarding P2P communication including which of the MSs may communicate by P2P with other MSs.

In step 222, the BS 100 selects a desired communication mode. For example, if a distance between the MSs is close enough to perform P2P communication and the MSs are located far from the BS 100 so that a BS-MS channel condition is poor, then P2P communication is advantageous over wireless communication. In this case, the BS 100 selects the P2P communication mode for the purpose of effective utilization of resources. On the contrary, if the distance between the MSs is far, and the MSs are located close to the BS 100 so that the BS-MS channel condition is good, then the BS 100 selects the wireless communication mode. For example, referring back to FIG. 1, the P2P communication mode is selected for communication between the MS 102 and the MS 104, and the wireless communication mode is selected for communication between the MS 102 and the MS 106 or between the MS 102 and the MS 108.

According to another exemplary embodiment, the MS 102 rather than the BS 100 may receive the PNR_rsp message from the MS 104, determine the possibility of P2P communication between the MS 102 and the MS 104, and report the determination result to the BS 100.

In step 224, the BS 100 transmits a connection response (hereinafter, connection_rsp) message to the MS 102 and the MS 104.

In step 226, the MS 102 and the MS 104 communicate with each other according to the communication mode selected by the BS 100. For example, as illustrated in FIG. 2, when the P2P communication mode is selected, a P2P connection is established according to a preset P2P communication process, and when the wireless communication mode is selected, a connection is established according to a call connection process via the BS 100.

Thereafter, the procedure of FIG. 2 ends.

Figure 3:
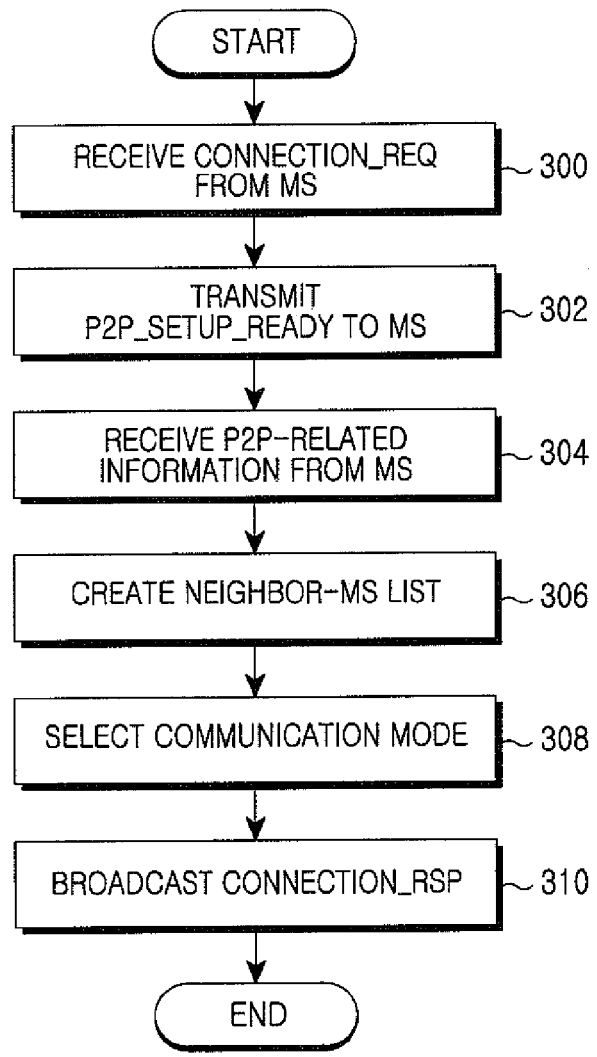
FIG. 3 is a flowchart illustrating an operation of a BS for adaptively selecting a communication mode in a wireless communication system according to an exemplary embodiment of the present invention.

FIG. 3 is a flowchart illustrating an operation of a BS for adaptively selecting a communication mode in a wireless communication system according to an exemplary embodiment of the present invention.

Referring to FIG. 3, the BS receives a connection_req message from an MS in step 300.

In step 302, in order to determine the possibility of P2P communication before establishing a connection in the wireless communication mode, the BS broadcasts a P2P_setup_ready message to relevant MSs.

In step 304, the BS receives P2P-related information (e.g., a P2P_GroupID, a Sender_ID, a Channel_Power_info, a Call_status, etc.) from the relevant MSs.

In step 306, the BS creates a list of neighbor MSs by using the P2P-related information received from the relevant MSs.

In step 308, according to the neighbor-MS information, the BS determines whether P2P communication is possible between the MSs. In other words, by determining whether the MSs are in a P2P communicable environment, the BS selects a desired communication mode.

In step 310, the BS transmits a connection_rsp message to the relevant MSs.

Thereafter, the procedure of FIG. 3 ends.

Figure 4:
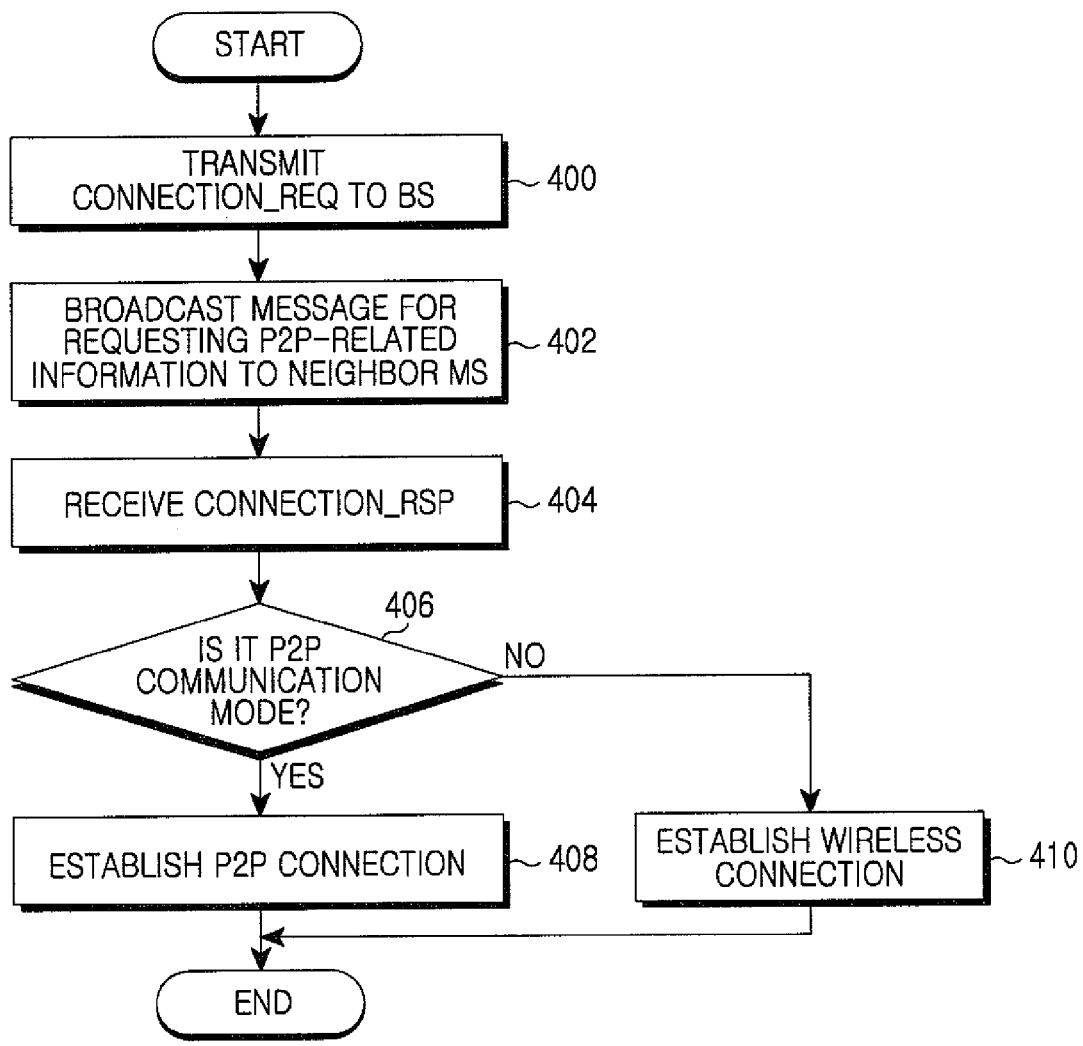
FIG. 4 is a flowchart illustrating an operation of a Mobile Station (MS) for adaptively selecting a communication mode in a wireless communication system according to an exemplary embodiment of the present invention.

FIG. 4 is a flowchart illustrating an operation of an MS for adaptively selecting a communication mode in a wireless communication system according to an exemplary embodiment of the present invention.

Referring to FIG. 4, the MS transmits a connection_req message to a BS including a request to communicate with another MS in step 400.

In step 402, after a time period elapses, the MS broadcasts a message for requesting P2P-related information to neighbor MSs.

In step 404, the MS receives a connection_rsp message from the BS.

In step 406, the MS determines a communication mode. If the communication mode is the P2P communication mode, the MS establishes a P2P connection with a corresponding MS in step 408.

Otherwise, if the communication mode is not the P2P communication mode, the MS communicates with the corresponding MS via the BS in step 410.

Thereafter, the procedure of FIG. 4 ends.

Figure 5:
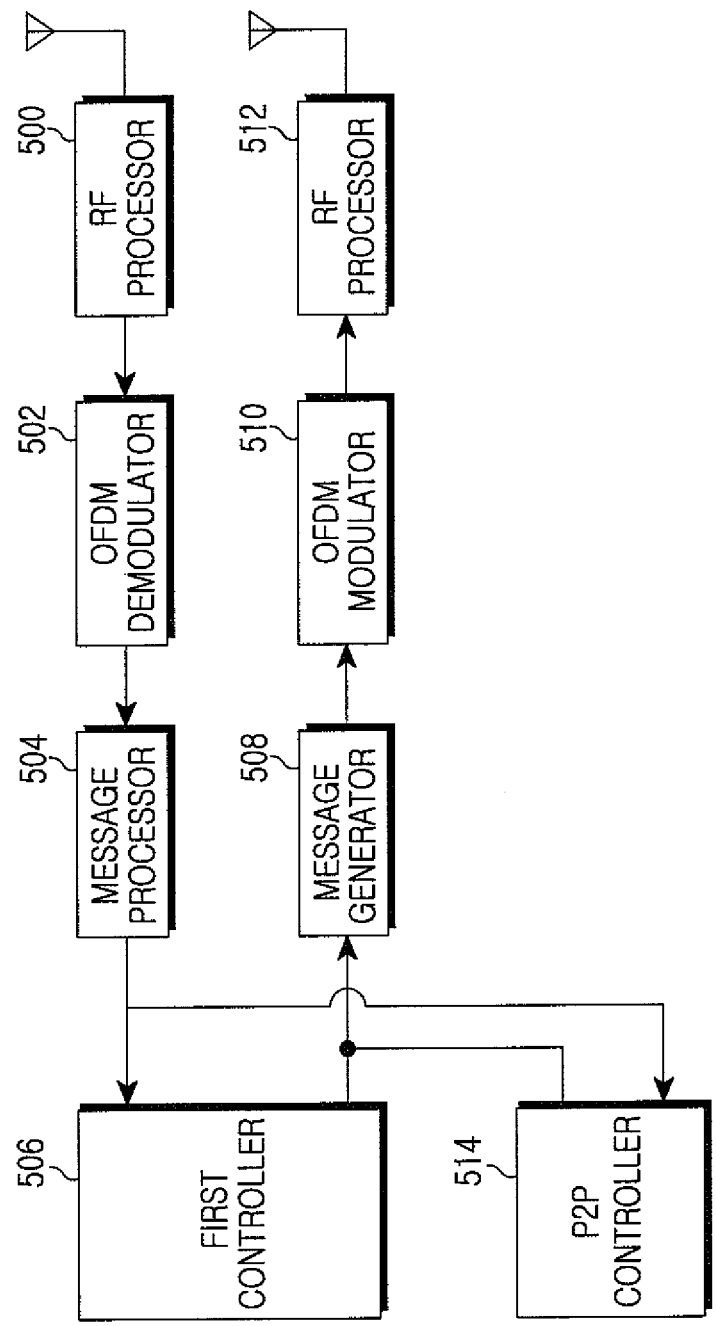
FIG. 5 is a block diagram illustrating an MS for establishing a P2P connection between MSs in a wireless communication system according to an exemplary embodiment of the present invention.

FIG. 5 is a block diagram illustrating an MS for establishing a P2P connection between MSs in a wireless communication system according to an exemplary embodiment of the present invention.

Referring to FIG. 5, the MS includes a Radio Frequency (RF) processor 500 for reception, an Orthogonal Frequency Division Multiplexing (OFDM) demodulator 502, a message processor 504, a first controller 506, a message generator 508, an OFDM modulator 510, an RF processor 512 for transmission, and a P2P controller 514.

The RF processor 500 converts an RF signal received through an antenna into a baseband analog signal. The OFDM demodulator 502 converts the analog signal received from the RF processor 500 into sample data. Further, the OFDM demodulator 502 converts the sample data into frequency-domain data through Fast Fourier Transform (FFT), and selects data of subcarriers to be received in practice from the frequency-domain data. Furthermore, the OFDM demodulator 502 demodulates and decodes data according to a preset Modulation and Coding Scheme (MCS) level and outputs the data to the message processor 504.

The message processor 504 decomposes a control message received from the OFDM demodulator 502 and provides the decomposition result to the first controller 506. Further, in a state of being switched to a P2P communication mode, the message processor 504 decomposes a P2P control message received from the OFDM demodulator 502 and provides the decomposition result to the P2P controller 514. For example, the message processor 504 processes a P2P connection message.

The first controller 506 performs a process suitable for information received from the message processor 504 and provides the result to the message generator 508. Further, in a state of being switched to the P2P communication mode, the P2P controller 514 performs a process suitable for P2P communication control information received from the message processor 504 and provides the result to the message generator 508.

The message generator 508 generates a message by using a variety of information received from the first controller 506 or the P2P controller 514 and outputs the generated message to the OFDM modulator 510 of a physical layer. For example, the message generator 508 generates a message for requesting information on neighbor MSs.

The OFDM modulator 510 codes and modulates data received from the message generator 508 according to the preset MCS level. Further, the OFDM modulator 510 converts the modulated data into sample data (i.e., an OFDM symbol) through Inverse Fast Fourier Transform (IFFT). Furthermore, the OFDM modulator 510 converts the sample data into an analog signal and outputs the analog signal to the RF processor 512. The RF processor 512 converts the analog signal into an RF signal and transmits the RF signal through an antenna.

The first controller 506 may receive information, which is required when a general wireless communication protocol is processed through a mobile switching station or a BS, from an element of the physical layer or may generate a control signal to be delivered to the element of the physical layer. The first controller 506 can control and use a transmitter and a receiver in a Time Division Duplex (TDD) or Frequency Division Duplex (FDD) mode.

The P2P controller 514 may receive information, which is required when a P2P communication protocol is processed between MSs, from an element of the physical layer or may generate a control signal to be delivered to the element of the physical layer. The P2P controller 514 can also be used based on the TDD or FDD mode. In addition thereto, the P2P controller 514 broadcasts a PNR_req message, and, if the BS selects the P2P communication mode, controls a P2P connection according to a preset P2P communication process.

In the aforementioned structure, the first controller 506 is provided as a protocol controller and controls the message processor 504, the message generator 508, and the P2P controller 514. That is, the first controller 506 can function as the message processor 504, the message generator 508, and the P2P controller 514. Although these elements are separately configured in the illustrated example, this is for explanation purposes only. Thus, in practice, all or some of these elements may be controlled by the first controller 506.

Figure 6:
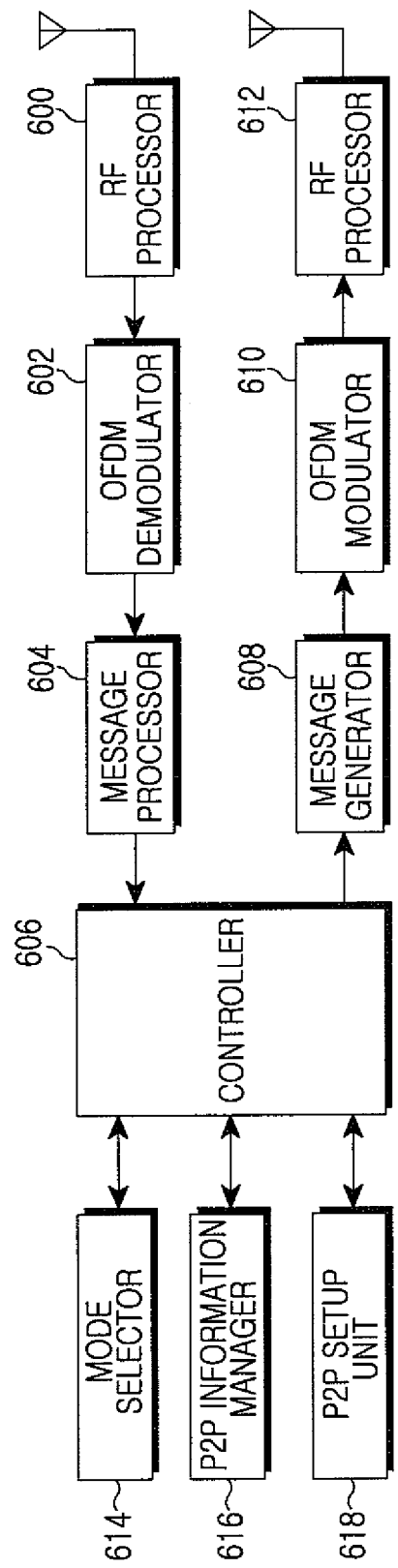
FIG. 6 is a block diagram illustrating a BS for establishing a P2P connection between MSs in a wireless communication system according to an exemplary embodiment of the present invention.

FIG. 6 is a block diagram illustrating a BS for establishing a P2P connection between MSs in a wireless communication system according to an exemplary embodiment of the present invention.

Referring to FIG. 6, the BS includes an RF processor 600 for reception, an OFDM demodulator 602, a message processor 604, a controller 606, a message generator 608, an OFDM modulator 610, an RF processor 612 for transmission, a mode selector 614, a P2P information manager 616, and a P2P setup unit 618.

The RF processor 600, the OFDM demodulator 602, the message processor 604, the controller 606, the message generator 608, the OFDM modulator 610, and the RF processor 612 have substantially the same functions as described with reference to FIG. 5, and thus detailed descriptions thereof will be omitted for brevity.

In a P2P connection process, the P2P information manager 616 allocates resources so that P2P communication can be maintained between the transmitting MS and a receiving MS, and also manages a P2P group list. For example, the P2P information manager 616 broadcasts a P2P_setup_ready message by using the message generator 608. Thereafter, the P2P information manager 616 gathers information included in a P2P neighbor report response (i.e., PNR_rsp) message processed by the message processor 604 and stores a P2P-related message. Then, the P2P information manager 616 provides P2P-related information to the mode selector 614 or the P2P setup unit 618 when necessary.

The mode selector 614 receives the P2P-related information from the P2P information manager 616, selects a preferable communication mode between BS-assisted communication and P2P communication among the MSs, and reports the selected mode to the controller 606.

If the mode selector 614 selects the P2P communication mode, the P2P setup unit 618 provides P2P connection information between the MSs.

In the aforementioned structure, the controller 606 is provided as a protocol controller and controls the message processor 604, the message generator 608, the mode selector 614, the P2P information manager 616, and the P2P setup unit 618. That is, the controller 606 can function as the message processor 604, the message generator 608, the mode selector 614, the P2P information manager 616, and the P2P setup unit 618. Although these elements are separately configured in the illustrated example, this is for explanation purposes only. Thus, in practice, all or some of these elements may be controlled by the controller 606.

According to exemplary embodiments of the present invention, a BS adaptively selects a communication mode by considering a wireless environment between MSs in a wireless communication system. Therefore, services can be provided in a good wireless environment. In addition, the wireless communication system can effectively use wireless resources.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of operating a Base Station (BS) for establishing a communication mode between Mobile Stations (MSs) in a wireless communication system, the method comprising:
   upon receiving a connection request message from a transmitting MS, broadcasting an instruction message to one or more neighbor MSs, the instruction message instructing the one or more neighbor MSs to prepare to receive a P2P report request message broadcast from the transmitting MS;
   receiving P2P-related information from a receiving MS among the one or more neighbor MSs in response to the reception of the P2P report request message at the receiving MS;
   determining whether a P2P communication is possible between the transmitting MS and the receiving MS according to the P2P-related information;
   selecting a communication mode based on a result of the determination; and
   if the P2P communication is possible between the transmitting MS and the receiving MS, transmitting a connection response message to the transmitting MS and the receiving MS.

2. The method of claim 1, wherein the determining of whether the P2P communication is possible comprises using the P2P-related information to determine whether the P2P communication is possible between the transmitting MS and the receiving MS.

3. The method of claim 1, wherein, if the P2P communication is not possible between the transmitting MS and the receiving MS, a communication between the transmitting MS and the receiving MS is performed via a Base Station (BS).

4. The method of claim 1, wherein the communication mode comprises at least one of a mode in which a communication with the receiving MS can be performed via the BS and a mode in which the P2P communication can be performed between the transmitting MS and the receiving MS.

5. The method of claim 1, wherein, if the transmitting MS and the receiving MS perform P2P communication, a frequency of the wireless communication system is reused.

6. The method of claim 1, further comprising, if there is no receiving MS among the neighbor MSs, establishing a connection between the transmitting MS and the receiving MS according to a general call connection process.

7. The method of claim 1, wherein the connection response message is reported so that the P2P connection is established between the transmitting MS and the receiving MS.

8. A method of operating a transmitting Mobile Station (MS) for establishing a communication mode between the transmitting MS and a receiving MS in a wireless communication system, the method comprising:
   after requesting a connection to a Base Station (BS), broadcasting a Peer to Peer (P2P) report request message to one or more neighbor MSs, the P2P report request message checking possibility of a P2P communication with the receiving MS;
   after broadcasting the P2P report request message, receiving a connection response message from the BS indicating whether the P2P communication with the receiving MS is possible; and
   establishing a connection with the receiving MS in a desired communication mode according to the connection response message.

9. The method of claim 8, wherein the communication mode comprises at least one of a mode in which a communication with the receiving MS can be performed via the BS and a mode in which the P2P communication can be performed between the transmitting MS and the receiving MS.

10. The method of claim 8, further comprising waiting for expiration of a time period after the requesting of the connection to the BS before broadcasting the P2P report request message.

11. A method of operating a receiving Mobile Station (MS) for establishing a communication mode between MSs in a wireless communication system, the method comprising:
    after receiving a Peer to Peer (P2P) setup ready message for instructing preparation of P2P setup from a Base Station (BS), preparing P2P setup;
    after preparing the P2P setup, receiving a P2P report request message for checking possibility of a P2P communication from a transmitting MS; and
    reporting P2P-related information to the BS in response to the P2P report request message.

12. The method of claim 11, wherein the BS can determine the possibility of the P2P communication between the transmitting MS and the receiving MS by using the P2P-related information.

13. A Base Station (BS) apparatus for establishing a communication mode between Mobile Stations (MSs) in a wireless communication system, the apparatus comprising:
    a controller for broadcasting an instruction message to one or more neighbor MSs upon receiving a connection request message from a transmitting MS, for receiving P2P-related information from a receiving MS among the one or more neighbor MSs in response to the reception by the receiving MS of a P2P report request message broadcast from the transmitting MS, and, if a P2P communication is possible between the transmitting MS and the receiving MS, for transmitting a connection response message to the transmitting MS and the receiving MS; and
    a mode selector for selecting a communication mode by determining whether the P2P communication is possible between the transmitting MS and the receiving MS according to the P2P-related information,
    wherein the instruction message includes a message instructing the neighbor MSs to prepare to receive the P2P report request message from the transmitting MS.

14. The apparatus of claim 13, wherein the P2P-related information can be used to determine whether the P2P communication is possible between the transmitting MS and the receiving MS.

15. The apparatus of claim 13, wherein, if the P2P communication is not possible between the transmitting MS and the receiving MS, a communication between the transmitting MS and the receiving MS is performed via the BS.

16. The apparatus of claim 13, wherein the communication mode comprises at least one of a mode in which a communication with the receiving MS can be performed via the BS and a mode in which the P2P communication can be performed between the transmitting MS and the receiving MS.

17. The apparatus of claim 13, wherein, if the transmitting MS and the receiving MS perform the P2P communication, a frequency of the wireless communication system is reused.

18. The apparatus of claim 13, wherein, if there is no receiving MS among the neighbor MSs, the controller establishes a connection between the transmitting MS and the receiving MS according to a general call connection process.

19. The apparatus of claim 13, wherein the connection response message is reported so that the P2P connection is established between the transmitting MS and the receiving MS.

20. A transmitting Mobile Station (MS) apparatus for establishing a communication mode between MSs in a wireless communication system, the apparatus comprising:
a controller for broadcasting a Peer to Peer (P2P) report request message to one or more neighbor MSs, the P2P report request message checking possibility of a P2P communication with a receiving MS after requesting a Base Station (BS) for a connection between the transmitting MS and the receiving MS, for receiving a connection response message from the BS indicating whether the P2P communication with the receiving MS after broadcasting the P2P report request message is possible, and for establishing a connection with the receiving MS in a desired communication mode according to the connection response message.

21. The apparatus of claim 20, wherein the communication mode comprises at least one of a mode in which a communication with the receiving MS can be performed via the BS and a mode in which the P2P communication can be performed between the transmitting MS and the receiving MS.

22. A receiving Mobile Station (MS) apparatus for establishing a communication mode between MSs in a wireless communication system, the apparatus comprising:
a controller for preparing Peer to Peer (P2P) setup after receiving a P2P setup ready message for instructing preparation of P2P setup from a Base Station (BS), for receiving a P2P report request message for checking possibility of the P2P communication from a transmitting MS after preparing the P2P setup, and for reporting P2P-related information to the BS in response to the P2P report request message.

23. The apparatus of claim 22, wherein the BS can determine the possibility of the P2P communication between the transmitting MS and the receiving MS by using the P2P-related information.

* * * * *